US012809672B2

(12) United States Patent
Gao et al.

(10) Patent No.: US 12,809,672 B2
(45) Date of Patent: Nov. 24, 2026

(54) TASK PROCESSING METHOD AND APPARATUS, ELECTRONIC DEVICE, STORAGE MEDIUM AND PROGRAM PRODUCT

(71) Applicant: Beijing Volcano Engine Technology Co., Ltd., Beijing (CN)

(72) Inventors: Xin Gao, Beijing (CN); Lei Liu, Beijing (CN); Zhongjia Wei, Beijing (CN); Chang Liu, Beijing (CN); Rui Shi, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 403 days.

(21) Appl. No.: 18/518,332

(22) Filed: Nov. 22, 2023

(65) Prior Publication Data

US 2024/0176657 A1 May 30, 2024

(30) Foreign Application Priority Data

Nov. 24, 2022 (CN) .......................... 202211486242.7

(51) Int. Cl.
*G06F 9/44* (2018.01)
*G06F 9/38* (2018.01)
*G06F 9/48* (2006.01)

(52) U.S. Cl.
CPC .......... *G06F 9/4881* (2013.01); *G06F 9/3836* (2013.01)

(58) Field of Classification Search
CPC ...... G06F 9/4881; G06F 9/3836; Y02D 10/00
(Continued)

(56) References Cited

U.S. PATENT DOCUMENTS 6,556,983 B1 * 4/2003 Altschuler ............ G06F 16/907 707/E17.011
7,895,666 B1 * 2/2011 Eshghi .................. H04L 9/3236 705/25
2014/0129285 A1 * 5/2014 Wu .................... G06Q 10/0633 705/7.27

FOREIGN PATENT DOCUMENTS

CN 113760407 A 12/2021
CN 114154019 A 3/2022
(Continued)

OTHER PUBLICATIONS

China Patent Application No. 202211486242.7; Notice of Allowance; dated Feb. 20, 2025; 5 pages.
(Continued)

*Primary Examiner* — Timothy A Mudrick
(74) *Attorney, Agent, or Firm* — BakerHostetler

(57) ABSTRACT

A task processing method and apparatus, an electronic device, a storage medium and a program product are provided. The method includes: receiving a remote shuffling service request of a target task, and generating a topological graph of the target task according to execution flow information of the target task in response to a remote system service request of the target task, the topological graph including a plurality of target nodes, and each target node corresponding to at least one subtask of the target task; matching information of the target node with information of at least one historical node to obtain a first matching result; sifting the target historical task based on a preset attribute condition; and determining, based on a sifting result, execution parameter recommendation information for the target task as a processing result of the remote shuffling service request.

20 Claims, 5 Drawing Sheets

(58) Field of Classification Search
USPC .......................................................... 718/102
See application file for complete search history.

(56) References Cited

FOREIGN PATENT DOCUMENTS

| | | | |
|---|---|---|---|
| CN | 115203512 | A | 10/2022 |
| WO | WO 2021/231640 | A1 | 11/2021 |

OTHER PUBLICATIONS

China Patent Application No. 202211486242.7; Office Action; dated Nov. 16, 2024; 15 pages.
Hu Zhenyu et al.; "A Memory-Estimation Method for Big-Data Applications Based on Program Analysis"; Scientific Sinica Information; vol. 50; 2020; p. 1178-1196 (contains English Abstract).
Paul et al.; "CHOPPER: Optimizing Data Partitioning for In-Memory Data Analytics Frameworks"; IEEE Int'l Conf. on Cluster Computing; 2016; p. 110-119.
Chen Qiao et al.; "Parameter optimization for Spark jobs based on runtime data analysis"; Computer Engineering & Science; vol. 38 No. 1; Jun. 2016; p. 11-19 (contains English Abstract).

* cited by examiner

TASK PROCESSING METHOD AND APPARATUS, ELECTRONIC DEVICE, STORAGE MEDIUM AND PROGRAM PRODUCT

CROSS-REFERENCE TO RELATED APPLICATION

The present application claims priority of the Chinese Patent Application No. 202211486242.7, filed on Nov. 24, 2022, the entire disclosure of which is incorporated herein by reference as part of the present application.

TECHNICAL FIELD

The present disclosure relates to the technical field of computer vision, in particular to a task processing method, a task processing apparatus, an electronic device, a storage medium, and a program product.

BACKGROUND

With the development of the computer technology, big data, as a subfield of the computer technology, is also constantly evolving. A big data computing engine is used to compute data within a data system. In the big data computing engine, there are a large number of similar task processing processes. The big data computing engine processes a large number of tasks, and the task processing process requires a large amount of resources. To execute the task, the big data computing engine allocates resources to the tasks to be processed, and how to reasonably allocate the resources needed for task processing can improve the execution efficiency of the task processing process of the big data computing engine.

SUMMARY

In view of this, embodiments of the present disclosure provide a task processing method, a task processing apparatus, an electronic device, a storage medium, and a program product, enabling the user of a data table to conveniently obtain statistical information related to the content of the data table.

According to some embodiments of the present disclosure, the above task processing method includes: receiving a remote shuffling service request of a target task, and generating a topological graph of the target task according to execution flow information of the target task in response to a remote system service request of the target task, where the topological graph includes a plurality of target nodes, and each target node corresponds to at least one subtask of the target task; matching information of the target node with information of at least one historical node to obtain a first matching result, where the historical node is a node of a topological graph corresponding to a historical task, and the first matching result includes at least one target historical task, that matches the target task, in one or more historical tasks; sifting the target historical task based on a preset attribute condition; and determining, based on a sifting result, execution parameter recommendation information for the target task as a processing result of the remote shuffling service request.

According to other embodiments of the present disclosure, a task processing apparatus is provided, which includes:

- a topological graph generating module, configured to receive a remote shuffling service request of a target task, and generate a topological graph of the target task according to execution flow information of the target task in response to a remote system service request of the target task, where the topological graph includes a plurality of target nodes, and each target node corresponds to at least one subtask of the target task;
- a first matching module, configured to match information of the target node with information of at least one historical node to obtain a first matching result, where the historical node is a node of a topological graph corresponding to a historical task, and the first matching result includes at least one target historical task, that matches the target task, in one or more historical tasks;
- a sifting module, configured to sift the target historical task based on a preset attribute condition; and
- a recommending module, configured to determine, based on a sifting result, execution parameter recommendation information for the target task as a processing result of the remote shuffling service request.

In addition, embodiments of the present disclosure provide an electronic device including a memory, a processor, and a computer program stored in the memory and executable on the processor, the processor implements the method described above when executing the program.

Embodiments of the present disclosure further provide a non-transitory computer-readable storage medium which stores computer instructions, and the computer instructions are used to cause the computer to implement the method described above.

Embodiments of the present disclosure also provide a computer program product including computer program instructions, the computer program instructions cause the computer to implement the method described above when running on a computer.

It can be seen from the above that through the task processing method and apparatus, the electronic device, the storage medium and the program product provided by the embodiment of the present disclosure, target historical tasks similar to the target task that has been received but not yet executed can be sifted out from the executed historical tasks, and the execution parameter recommendation information of the target task can be determined according to the target historical tasks.

BRIEF DESCRIPTION OF THE DRAWINGS

To clearly illustrate the technical solution of the embodiments of the present disclosure or the related technology, the drawings required in the description of the embodiments or the related technology will be briefly described in the following; it is obvious that the described drawings are only some embodiments of the present disclosure. For those skilled in the art, other drawings can be obtained based on these drawings without any inventive work.

DETAILED DESCRIPTION

In order to make objects, technical solutions and advantages of the embodiments of the present disclosure clearer, the present disclosure is further described below in connection with the specific embodiments and with reference to the accompanying drawings.

It should be noted that, unless otherwise defined, all the technical and scientific terms used herein have the same meanings as commonly understood by those of ordinary skill in the art to which the present disclosure belongs. The terms "first", "second", and the like, which are used in the description and the claims of the present disclosure, are not intended to indicate any sequence, amount or importance, but used to distinguish various components. Similarly, the terms "a", "an", "the", or the like are not intended to indicate a limitation of quantity, but indicate that there is at least one. The terms, such as "comprise/comprising", "include/including", or the like are intended to specify that the elements or the objects stated before these terms encompass the elements or the objects and equivalents thereof listed after these terms, but not preclude other elements or objects. The terms, such as "connect/connecting/connected", "couple/coupling/coupled", or the like, are not limited to a physical connection or mechanical connection, but may include an electrical connection/coupling, directly or indirectly. The terms, "on", "under", "left", "right", or the like are only used to indicate relative position relationship, and when the position of the object which is described is changed, the relative position relationship may be changed accordingly.

The modifiers "a", "a plurality of" and "at least one" mentioned in the embodiments of the present disclosure are for illustration rather than limitation. Those skilled in the art should understand that, unless otherwise clearly stated in the context, they should be understood as "one or more".

In general, service logic is completely coupled in a routing module, and a code of the routing module need to be modified every time a routing rule is added, thus causing inconvenience to the updating and code maintenance of the routing module.

Figure 1:
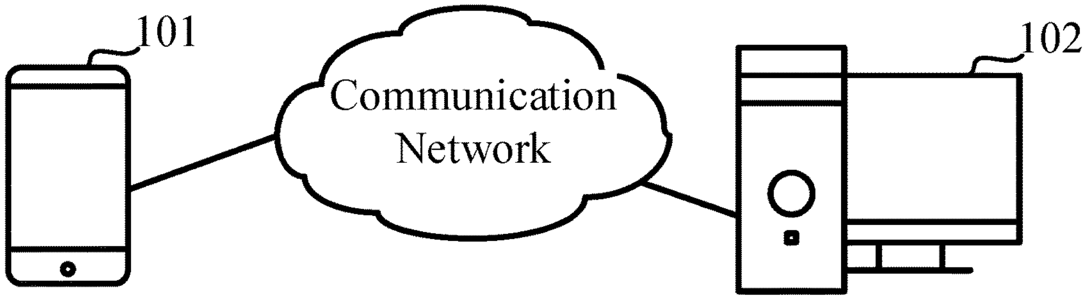
FIG. 1 is a diagram of one of application scenarios of a task processing method provided by an embodiment of the present disclosure.

To this end, some embodiments of the present disclosure provide a task processing method. Referring to FIG. 1 which is a diagram of an application scenario of a task processing method provided by an embodiment of the present disclosure, the application scenario includes a terminal device 101 and a storage device 102 for storing historical tasks. The terminal device 101 and the storage device 102 may be devices in a system for performing a shuffling operation.

In the embodiment of the present disclosure, the terminal device 101 can run a plurality of tasks, and can be one of a plurality of devices on a server.

In the embodiment of the present disclosure, the terminal device 101 includes, but is not limited to, a desktop computer, a mobile phone, a mobile computer, a tablet computer, a media player, an intelligent wearable device, a personal digital assistant (PDA) or other electronic devices that can realize the above functions. According to a received task, the terminal device 101 can determine parameters needed to execute the task.

Based on the above application scenario and other possible application scenarios, some embodiments of the present disclosure provide a task processing method that may invoke the terminal device 101 and the storage device 102 to search for matching target historical tasks in previously executed historical tasks for a newly received target task and determine execution parameters for the target task based on a search result.

In the situation where it is not necessary to obtain required content for viewing statistical information through a communication network, the embodiment of the present disclosure can also be applied to the above terminal device and storage device that are not connected to the network.

Figure 2:
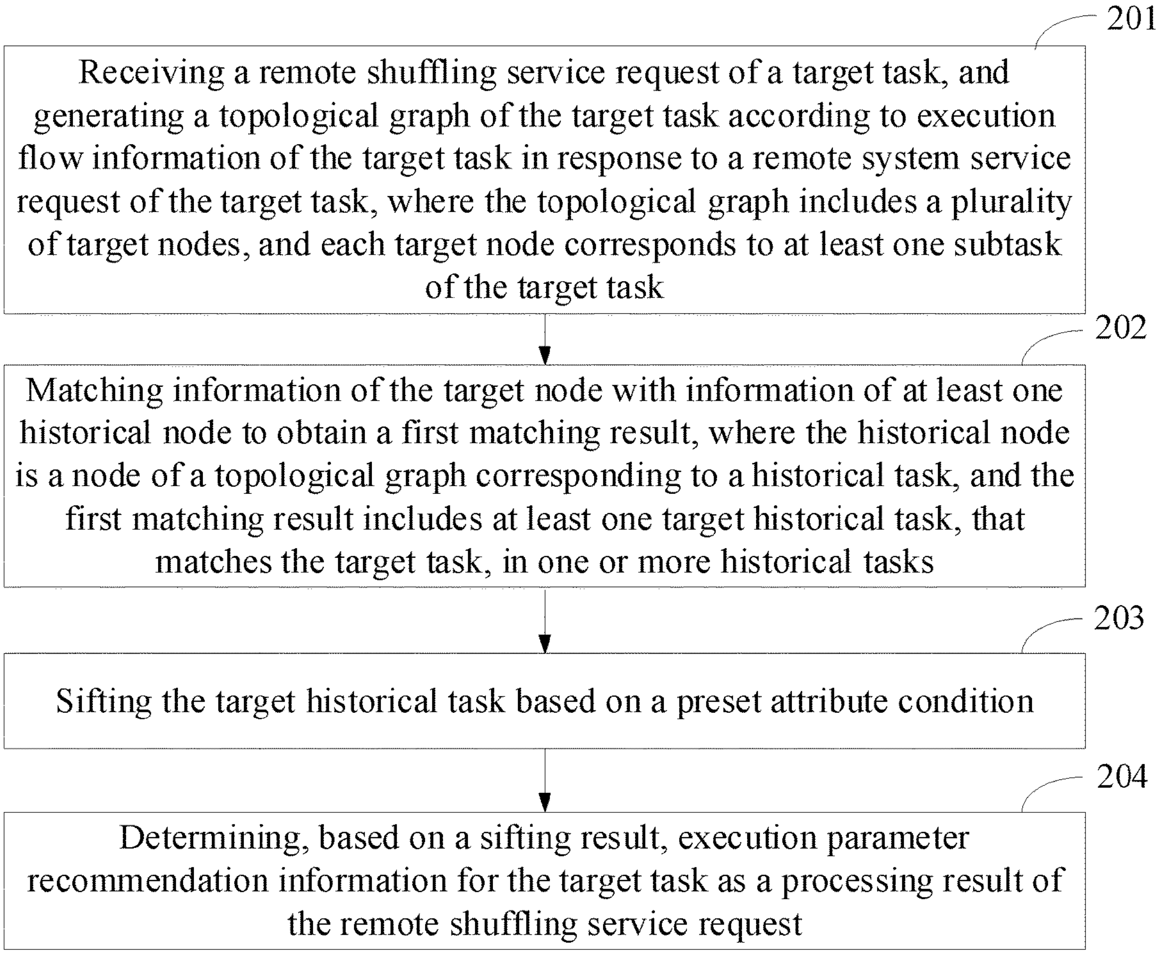
FIG. 2 is a flowchart of a task processing method provided by some embodiments of the present disclosure.

FIG. 2 is a flowchart of a task processing method provided by an embodiment of the present disclosure. As shown in FIG. 2, the task processing method may include the following steps:

Step 201, receiving a remote shuffling service request of a target task, and generating a topological graph of the target task according to execution flow information of the target task in response to a remote system service request of the target task, where the topological graph includes a plurality of target nodes, and each target node corresponds to at least one subtask of the target task;

Step 202, matching information of the target node with information of at least one historical node to obtain a first matching result, where the historical node is a node of a topological graph corresponding to a historical task, and the first matching result includes at least one target historical task, that matches the target task, in one or more historical tasks;

Step 203, sifting the target historical task based on a preset attribute condition; and Step 204, determining, based on a sifting result, execution parameter recommendation information for the target task as a processing result of the remote shuffling service request.

In an embodiment of the present disclosure, the task processing method can be applied to a big data computing engine that calculates a target task, and the big data computing engine is used to perform remote shuffling service processing for the target task received by a big data framework, and the steps shown in FIG. 2 are executed for the remote shuffling service processing of the target task. The target task can be a task submitted to a task processing platform (big data computing engine) for processing. When receiving a new task, the task processing platform can take the new task as the target task and execute the task processing method provided by the embodiment of the present disclosure based on the newly received target task. The task processing platform can be a big data platform, such as MapReduce, Apache Spark and other big data frameworks that can be used for task processing.

In the embodiment of the present disclosure, the target task to be processed by the task processing platform can be divided into a plurality of subtasks, and each subtask can correspond to an execution stage of the target task. For example, if the target task is divided into N execution stages that are executed in sequence, N subtasks corresponding to the execution stages will be executed during the execution of the target task.

In an embodiment of the present disclosure, subtasks included in the target task can be determined based on the target task, nodes corresponding to the subtasks can be constructed, and then edges between the nodes can be determined according to an execution sequence of the subtasks. A topological graph of the target task is formed by the constructed nodes and the edges between the nodes. In the embodiment of the present disclosure, the topological graph can be represented by a directed acyclic graph or a tree diagram.

In the embodiment of the present disclosure, matching the information of the target node with the information of the historical nodes may be to match at least one target node in the topological graph with at least one historical node corresponding to the historical tasks.

In the embodiment of the present disclosure, the historical task may be a completed task. Similar to the target task, the historical task can also be divided into a plurality of subtasks, and a topological graph corresponding to the historical task can be constructed according to the subtasks. In order to distinguish the historical task from the target task, nodes in the topological graph of the historical task are called historical nodes. When matching the target node with the historical node, a depth of the target node is the same as that of the historical node. For example, if the target node being matched is a root node in the topological graph, the corresponding matching historical node is also a root node in the topological graph. If the target node being matched is a first-level node in the topological graph, the corresponding matching historical node is also a first-level node in the topological graph.

In the embodiment of the present disclosure, matching the information of the target node with the information of the historical nodes to obtain a first matching result may be from the historical tasks to sift whether there is a task with a certain similarity to the target task. Whether different tasks match can be determined from many aspects, like whether execution stages of the tasks are close, whether task operators are the same, whether operator parameters of the tasks are close, etc.

In the embodiment of the present disclosure, sifting the target historical tasks based on the preset attribute condition may be to sift the target historical tasks based on the preset attribute condition and attribute information of each target historical task, so as to obtain at least one target historical task satisfying the preset attribute condition.

In the embodiment of the present disclosure, determining execution parameter recommendation information for the target task based on a sifting result may be to determine a value range of execution parameters of the target task as the execution parameter recommendation information based on the target historical tasks included in the sifting result.

In general, the big data framework (MapReduce/Spark), or the big data computing engine, or the aforementioned task processing platform, all contain a general computing process called shuffle. The performance of shuffle largely determines the task running speed of the big data framework (or big data platform). In order to improve shuffle performance and achieve separation of storage and computation, major vendors have introduced the Remote Shuffle service, which can scale elastically or reject high-load tasks based on the shuffle situation of tasks. A task can be represented by an Application, and one task corresponds to one Application. An Application consists of a plurality of stages, which can correspond to the subtasks in the above-mentioned embodiment. After a stage is completed, resources will be released, which is disadvantageous for multi-stage tasks. Additionally, ad hoc tasks are becoming more and more prominent, which lack historical information for predictive analysis, thus necessitating an approximating method for shuffle situations. In this embodiment of the present disclosure, stages can be regarded as subtasks to estimate task situations such as shuffle at the stage level. The specific method is graph matching based on the execution logic of the task, (e.g., Directed Acyclic Graph, DAG). When the method provided by this embodiment is applied to a big data framework, the historical information of the stage can be directly queried in a database based on the encoding. The encoding of the stage is divided into at least one level according to the accuracy of matching, thereby approximating the relevant situation of shuffle execution parameters of the stage to the maximum extent.

In general, data skewness often occurs in the big data platform where multiple tasks are processed in parallel. Data skewness refers to the fact that when data processing is performed in parallel, because the data in a single partition is significantly more than that in other partitions, leading to an uneven distribution of data and causing a large amount of data to be concentrated on one or a few compute nodes. As a result, the processing speed of that portion is much slower than the average processing speed, causing a bottleneck for the entire dataset processing and affecting overall computational performance. Based on estimating the shuffle situation at the stage level, the embodiment of the present disclosure can set reasonable execution parameters (e.g., partition number, cache size) for shuffling, thus solving the problem of data skewness in partitions.

In this embodiment, the recommended parameter information is a shuffle situation estimation result of the target task.

It can be seen that through the task processing method provided by the embodiment of the present disclosure, target historical tasks similar to the target task that has been received but not yet executed can be sifted out from the executed historical tasks, and the execution parameter recommendation information of the target task can be determined according to the target historical tasks.

In the embodiment of the present disclosure, the execution parameter recommendation information can be used to provide a reference for the execution parameter configuration of the target task. For example, it can estimate the required quantity of various computational resources for the target task and apply for corresponding computational resources accordingly. By setting an appropriate amount of computational resources for the target task, it can avoid over-requesting resources and prevent adverse impacts on the execution of other tasks.

In an embodiment of the present disclosure, matching the information of the target node with the information of the at least one historical node to obtain the first matching result includes:

matching first information of the target node with first information of the at least one historical node to obtain a first historical task, where a structure similarity between a topological graph of the first historical task and the topological graph of the target task is greater than a first threshold;

matching second information of the target node with second information of a historical node of the first historical task to obtain a second historical task, where a similarity between operator information of the second historical task and operator information of the target node is greater than a second threshold; and obtaining the first matching result according to the second historical task.

In the embodiment of the present disclosure, the topological graph of the target task reflects an execution plan of the target task. A unified task execution stage division method can be set in advance, and each historical task can be divided into a plurality of subtasks according to the unified division method. After receiving a new target task, the target task can be divided into a plurality of subtasks according to the unified division method, so that the topological graph of the target task is comparable to that of the historical task.

In one embodiment of the present disclosure, the subtasks may be a plurality of preset subtasks. For example, a subtask set can be predetermined, which includes all the subtasks, and each task can be composed of a plurality of subtasks selected from the subtask set.

In the embodiment of the present disclosure, the first information may be information reflecting the structure of the topological graph. For example, the information of each node in the topological graph can be summarized, and the summarized information can be used as the first information. For another example, information describing and expressing the structure of the topological graph can be generated as the first information. For another example, codes can be generated to record the information of the root node and non-nodes of each layer of the topological graph, and the codes can be used as the first information.

The second information of the target node may be related information that can represent operator information of the target node. For example, the operator type can be converted into numbers, and the similarity between the target node and the historical node can be determined based on the similarity of the corresponding numbers of the target node and the historical node.

The second information can also be related information reflecting operator information from multiple levels. For example, the second information may include information reflecting the operator type and information reflecting operator parameters.

In the embodiment of the disclosure, the second information is more detailed than the first information, that is, the first information can be framework information of the target task, and the second information can be detailed information of the target task.

In the embodiment of the present disclosure, the target historical tasks are sifted out from the historical tasks based on the first information and the second information successively, and the second information is information that represents the task in more detail than the first information, so as to realize the gradual refinement sifting of historical tasks in the matching process, exclude historical tasks with great differences as early as possible, and finally select the historical task with the highest matching degree as the target historical task.

In an embodiment of the present disclosure, the first information of the target node is obtained based on an identification number of the target node, the second information of the target node is obtained based on the identification number of the target node, and the identification number of the target node is obtained by hash calculation according to a depth of the target node and an identification number of a parent node of the target node.

In an embodiment of the present disclosure, the first information and the second information are both topology numbers of the target node. During matching, corresponding nodes in the topological graphs of the target task and the historical task are compared. For example, the root node in the topological graph of the target task is compared with the root node in the topological graph of the historical task, a first-level child node in the topological graph of the target task is compared with a first-level child node in the topological graph the historical task, and so on.

By encoding the nodes of the topological graph, the structure of the topological graph can be embodied through digital content.

In an embodiment of the present disclosure, the target node includes a root node and a target descendant node of a target root node, the first information of the at least one historical node includes an identification number of the at least one historical node, and matching the first information of the target node with the first information of the at least one historical node includes:

matching an identification number of the target root node, as first information of the target root node, with an identification number of a root node in the at least one historical node to obtain a third historical task in the one or more historical tasks, where the identification number of the target root node is calculated based on an identification number of the target descendant node; and matching the identification number of the target descendant node, as first information of the target descendant node, with identification numbers of descendant nodes in historical nodes of the third historical task, where the identification number of the target descendant node is obtained based on an identification number of a child node of the target descendant node.

In the embodiment of the present disclosure, during matching, the information to be matched can be further refined step by step to realize multi-level matching. Starting from a more general level, the information of the target task and the information of the historical tasks are matched layer by layer to realize the step-by-step sifting of the historical tasks, which can not only ensure the sifting of the target historical tasks close to the target task, but also improve the task matching efficiency.

In an embodiment of the present disclosure, the second information of the target node includes operator name information and operator parameter information, and matching the second information of the target node with the second information of the historical node of the first historical task includes:

matching operator name information of the target node with operator name information of the historical node of the first historical task to obtain a fourth historical task, where operator type information of the target node is calculated according to a code of the target node, and an operator name and an input table name included in a subtask corresponding to the target node; and matching operator parameter information of the target node with operator parameter information of the fourth historical task, where the operator parameter information of the target node is calculated according to the code of the target node, the operator name included in the subtask corresponding to the target node, the input table name included in the subtask corresponding to the target node, and partitions and operator parameters included in the subtask corresponding to the target node.

In the embodiment of the present disclosure, the operator parameter information differs from the execution parameters of the target task. The operator parameter information is pre-set parameters in an operator when the target task is generated, while the execution parameters of the target task, such as the amount of resources needed for executing the target task and the amount of resources to be applied for, are not known by the platform when the target task is received.

The platform needs to estimate the execution parameters, such as the amount of resources to be applied for, based on the historical tasks, and execute the target task accordingly.

In the embodiment of the present disclosure, the operator parameter information provides more detailed information about the content of the target task compared to the operator name information. By performing separate matching for the operator parameter information and the operator name information, step-by-step sifting of the plurality of historical tasks can be achieved.

In an embodiment of the present disclosure, sifting the target historical task based on the preset attribute condition includes:

based on the preset attribute condition, sifting one or more target historical tasks, where a time difference between task execution time and current time is less than a preset time threshold, as the sifting result.

In the embodiment of the present disclosure, considering that it is possible for the execution parameters to change during multiple execution processes even for tasks with similar structures and operators, historical tasks occurring in close proximity to the current time are chosen as the target historical tasks.

In an embodiment, based on a sifting result, determining execution parameter recommendation information for the target task, includes:

setting the execution parameter recommendation information of the target task with reference to an execution parameter of a target historical task corresponding to the sifting result.

In an embodiment of the present disclosure, the parameter of the target historical task can be directly used as the parameters of the target task. One can also calculate the execution parameter of the target historical task to obtain the estimated value of the execution parameter of the target task, and use the estimated value as the execution parameter recommendation information.

In an embodiment of the present disclosure, setting the execution parameter recommendation information of the target task with reference to the execution parameter of the target historical task corresponding to the sifting result includes:

reading group counter information of the target historical task, and if it is determined based on the group counter information that there is a memory overflow situation in the target historical task: based on a partition setting corresponding to the execution parameter of the target historical task, increasing the partition setting according to a set step size, and determining the execution parameter recommendation information according to the partition setting after being increased; and reading executor resource idle information of the target historical task, and if it is determined based on the executor resource idle information that a read amount of a shuffling operation of a single task is less than a set threshold: based on the partition setting corresponding to the execution parameter of the target historical task, reducing the partition setting according to the set step size, and determining the execution parameter recommendation information according to the partition setting after being reduced.

Generally, there are a default number of partitions in a Remote Shuffle scheme. Setting the number too large would waste Remote Shuffle service resources (including cache, slots, file handles, etc.), while setting it too small would result in insufficient task parallelism and even memory overflow. An embodiment of the present disclosure provides a method for setting an appropriate number of partitions based on the running situation of target historical tasks.

In an example of the present disclosure, online tasks of big data frameworks like Spark can be classified into three categories: tasks with unique identification numbers, periodic tasks with missing identification numbers, and ad hoc tasks. The periodic tasks with unique identification numbers are usually hosted on a cloud platform. The platform assigns a unique identification number to the task and passes it to a computing framework. Periodic tasks can also undergo updates, some of which may bring changes to the execution logic. In the embodiment of the present disclosure, such changes can be detected. The periodic tasks with missing identification numbers are typically triggered by users at scheduled times and share the characteristics of periodic tasks, but no information is transferred to the computing framework. In the embodiment of the present disclosure, periodic tasks with missing identification numbers can be identified as periodic tasks and their historical information can be retrieved. Ad hoc tasks, typically performed by data analysts, can exist in online scenarios. In the embodiment of the present disclosure, approximate matching of similar tasks can be performed to estimate the execution parameters of shuffling operation. The encoding method of DAG can be used for isomorphism matching of DAGs. To achieve stage-level matching, on the basis of DAG encoding, a three-level stage encoding method is provided. Firstly, codes containing a smaller amount of framework information are matched, and then codes containing more stage details are matched.

The three-level encoding constructed in the embodiment of the present disclosure can be: jobTopologySignature, stageTopologySignature, stagePlanSignature and stageExecSignature, respectively.

JobTopologySignature represents the topological encoding of job, considering only the topological graph of an execution plan. It is equivalent to the first information of the target root node in the above embodiment. Periodic tasks may also be updated, and task updates may result in changes to the execution plan. This encoding can be used to determine if the topology graphs of execution plans are identical. StageTopologySignature represents the topological encoding of stage, which is equivalent to the first information of the target descendant node in the above embodiment. StagePlanSignature is equivalent to the operator name information of the target node in the above embodiment. The actual execution of the task may involve different inputs and operators, and stagePlanSignature includes input table names and operator names in hash calculation. StageExecSignature is equivalent to the operator parameter information of the target node in the above embodiment, which includes input partitions and operator parameters in hash calculation, resulting in a perfect match for stage. In addition, tasks also include: recursiveUniqueId (unique identification numbers for periodic tasks, periodic tasks are usually hosted on a cloud platform and are given a globally unique identification number that can identify different running instances as the same task), submitTime (task submission time), and stageInformation (information related to the stage, including partitionNumber, shuffle size, identification number of skewed partition, task execution time, and executor memory usage).

In some embodiments of the present disclosure, after the execution of tasks in big data frameworks like Spark, the encoding information of the stage and shuffle information need to be saved in a database. When a new task is submitted for execution, step-by-step matching is performed in the database based on the encoding, and if a match with stageExecSignature is found, the obtained stage information is completely accurate.

Figure 3:
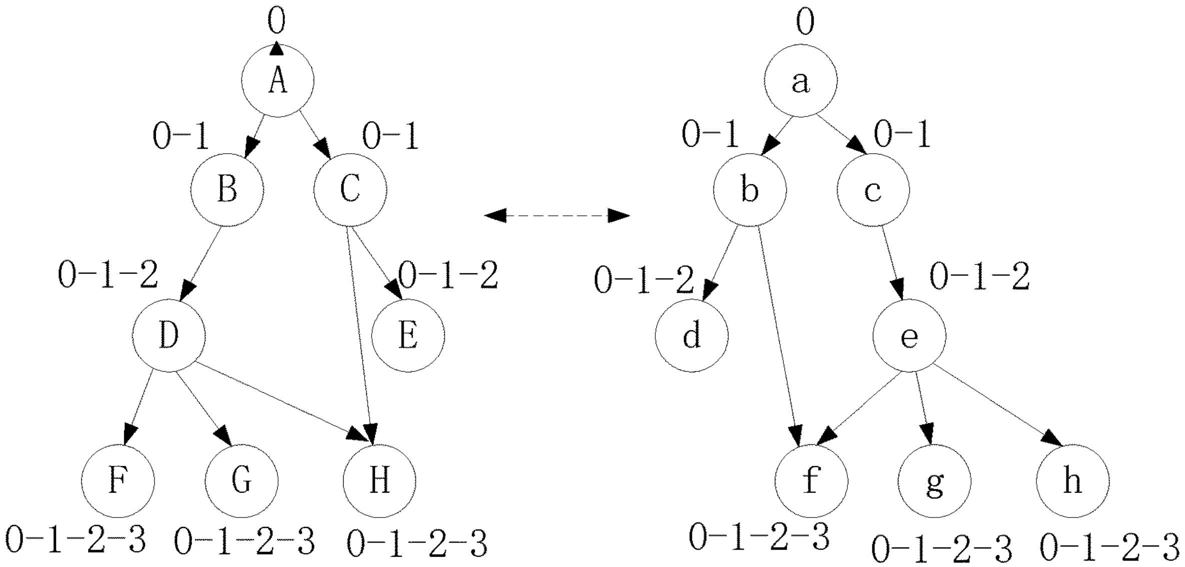
FIG. 3 is a diagram of topological graph matching provided by an embodiment of the present disclosure.

In the matching process of jobTopologySignature and stageTopologySignature, recursive matching is adopted in the embodiment of the present disclosure. For example, to determine whether the execution plans of Job1 and Job2 in FIG. 3 are isomorphic, starting from the root node of Job1, the child nodes B and C of the node A are traversed, and the corresponding nodes b and c in Job2 are checked for isomorphism with B and C, and so on. This method is complex and the database may not support complex query processes.

In another embodiment, nodes in the graph are first numbered, and based on identification numbers, the first information and second information of each node of a task are obtained. Still referring to FIG. 3, the identification number of the root node is 0, and the identification numbers of other nodes are obtained by concatenating the identification number of a parent node with the level number of the node. By performing a pre-order traversal algorithm, the process described above can be achieved. The result obtained from this process is denoted as preTopologyId. Anode may have different level numbers, for example, the node H can have the level numbers 0-1-2-3 and 0-1-2, in which case the longest number is taken. Based on preTopologyId, jobTopologySignature is calculated (the jobTopologySignature of the root node is equivalent to the first information of the target root node). The specific process involves a post-order traversal of the nodes, i.e., first visiting the child nodes to obtain their identification numbers, and then visiting the parent node to calculate its identification number according to the identification numbers of the child nodes.

The jobTopologySignature calculation formula for the identification number of the parent node is: jobTopologySignature(parent)=hash(order(jobTopologySignature(child))). Here, order represents sorting the parameters, and hash represents evaluating the parameters using a hash function. For example, jobTopologySignature(D)=hash(hash(F), hash (G), hash(H)). The hash values of nodes F, G, and H are the same in FIG. 3, so the order can be ignored. Another example is jobTopologySignature(A)=hash(jobTopologySignature(B), jobTopologySignature(C)), assuming that the hash value of node B is smaller than that of node C. By using the above-mentioned pre-order and post-order traversal, if the jobTopologySignature calculation results for the identification numbers of nodes A and a are equal, then it can be determined that nodes A and a are isomorphic, meaning that tasks Job1 and Job2 have isomorphic execution plans with similar operator sets and execution sequences. The calculation process of stageTopologySignature is similar to jobTopologySignature. In the jobTopologySignature calculation process, the descendant nodes of the root node are taken as stage, and the identification numbers of the descendant nodes obtained from calculating are used as stageTopologySignature identification numbers of stage (equivalent to the first information of the target descendant nodes in the aforementioned embodiment). StagePlanSignature represents the operator name information and takes into account the input table names and operator names. The calculation process is similar to jobTopologySignature, but the hashing function incorporates input table names (inputTables) and operator names (operatorNames) as parameters. The calculation formula can be: stagePlanSignature(parent) =hash(order(stagePlan Signature(child)), inputTables, operatorNames), calculated based on the identification numbers of the nodes. Comparing the stagePlanSignature of the root node of the topological graph can determine if any changes have occurred in the periodic tasks. StageExecSignature represents the operator parameter information and takes into account input partitions and operator parameters. The calculation process is similar to stagePlanSignature, but the hashing function incorporates input partitions and operator parameters (operatorParameters) as parameters. StageExecSignature=hash(order(stageExecSignature (child)), inputTables, partitions, operatorNames, operatorParameters). Input partitions of periodic tasks usually change, while operator parameters (operatorParameters) usually remain unchanged. Therefore, only including operatorParameters in the hash calculation can determine if changes have occurred in the periodic tasks. This method of comparing the stagePlanSignature of the root node provides more accurate results.

Figure 4:
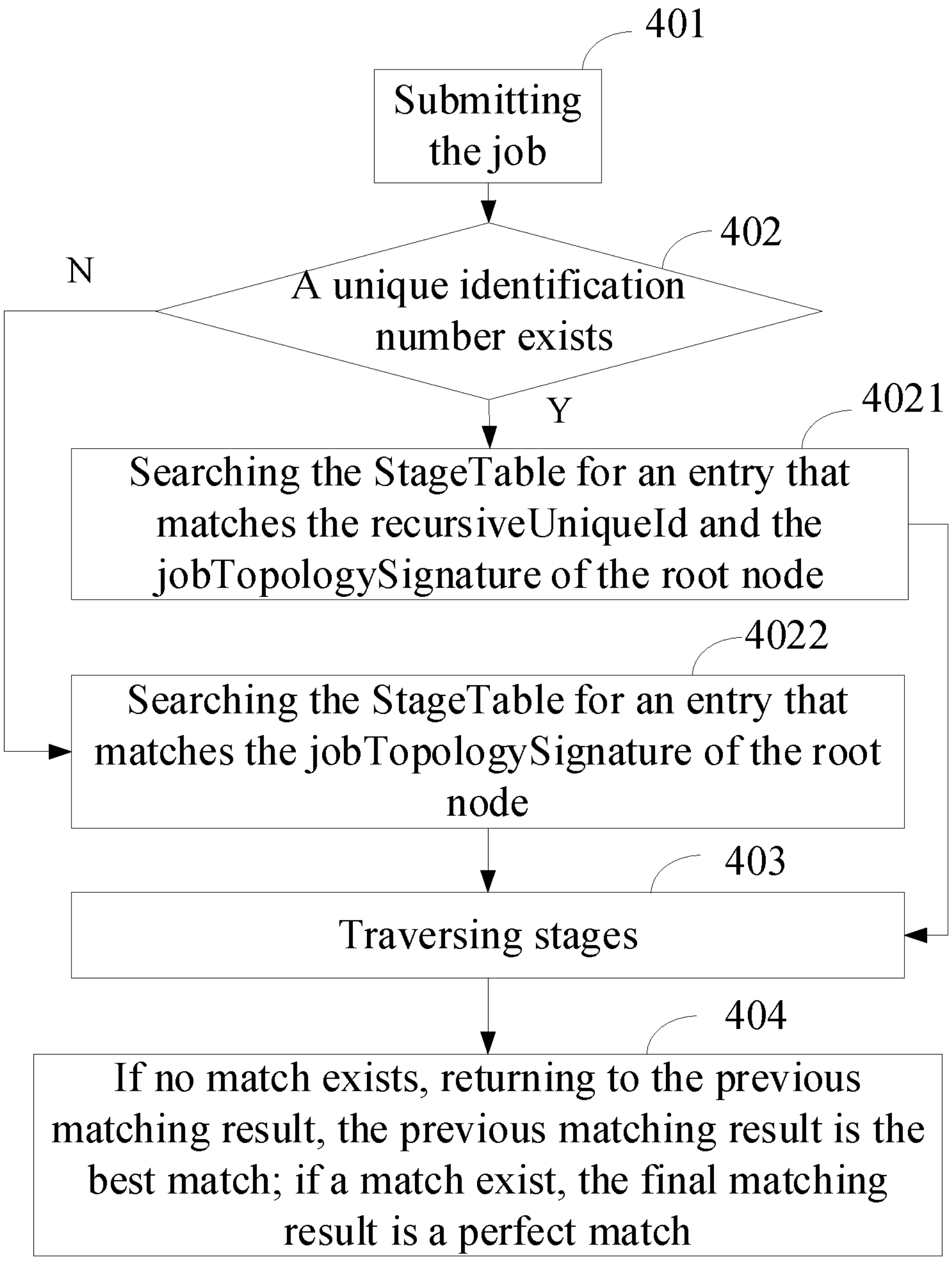
FIG. 4 is a diagram of a matching process between a target task and historical tasks provided by an embodiment of the present disclosure.

FIG. 4 shows best matching process for stage. The process specifically includes:

Step 401, submitting the job. When a job is submitted, the execution plan DAG of the job is passed to the SignatureSystem to calculate four identification numbers for each stage.

Step 402, checking if a unique identification number exists. Specifically, if the job has a unique periodic identification number (recursiveUniqueId) is determined. If yes, proceed to Step 4021. If not, proceed to Step 4022.

Step 4021, if a unique identification number exists, searching the StageTable for an entry that matches the recursiveUniqueId and the jobTopologySignature of the root node. If a match is found, proceed to Step 403. If not, proceed to Step 404.

Step 4022, if a unique identification number does not exist, searching the StageTable for an entry that matches the jobTopologySignature of the root node. If a match is found, proceed to Step 403. If not, proceed to Step 404.

Step 403, traversing stages. In this step, all stages are traversed and matched in the order specified (matching the stageTopologySignature, stagePlanSignature, and stageExecSignature of each node that includes jobTopologySignature from the previous matching step). If a match is found, repeat Step 403. If no match is found, proceed to Step 404.

Step 404, if no match exists, returning to the previous matching result, the previous matching result is the best match; if a match exists, the final matching result is a perfect match. If the matching result is empty, it implies that there is no historical information for the job and the stage, and only default configurations can be used. The actual execution process involves database queries, and the result set of matching gradually narrows down. This process is not conducive to the query performance of the database. The existence of the previous step's result set can be determined. When the result set is empty, it indicates that the previous matching was the best match. The previous matching can be executed directly to avoid slow queries on a large amount of data in the database. The number of tasks generally fluctuates slowly, and recent historical information is the most accurate. Usually, historical information from the past 3-4 days is considered. For special times that may impact the service, such as holidays, estimations can be made based on the comparison with previous periods. The most important thing is to estimate the shuffle size and resource usage. To ensure the service quality of tasks, the maximum historical value from the past 3-4 days is usually considered. Remote Shuffle maintains a quota status and scales elastically based on the shuffle size and resource requirements or rejects tasks that may impact cluster stability.

In the embodiment of the present disclosure, the recommended Shuffle parameter ConfigOpt partition (optimal partition configuration) count is the most important parameter influencing shuffle performance. Reasonable partition count ensures task parallelism, avoids Shuffle resource waste, and reduces small IO (Input/Output). A method for setting the partition count is as follows:

- initializing the partition count of a target task with an increase ratio of a=1 and a decrease ratio of b=0.5;
- reading historical stage information, and if task GC (task group counter) is severe (meaning long time consumption for task GC) and there are cases of task memory overflow, determining that the partition is set too small;
- obtaining the partition count paritionNum of a target historical task, and setting the partition count as (1+a)×partitionNum;
- if the task fails or becomes slower, returning to the previous partition setting and making a=a/2;
- reading the historical stage information, and if an executor resource is idle, the shuffle read volume of a single task is unusually small, and the task execution time is particularly fast, determining that the partition is set too large; and
- obtaining the previous partition count paritionNum, setting the partition count as (1−b)×partitionNum, and if the task fails or becomes slower, returning to the previous partition setting and making b=b/2.

It should be noted that some embodiments of the present disclosure have been described above, and other embodiments are within the scope of the appended claims. In some cases, the actions or steps recited in the claims can be performed in a different order than in the above embodiments and still achieve the desired results. In addition, the processes depicted in the drawings do not necessarily require the specific order shown or the sequential order to achieve the desired results. In some embodiments, multitasking and parallel processing are also possible or may be advantageous.

Corresponding to the above method, an embodiment of the present disclosure discloses a task processing apparatus.

Figure 5:
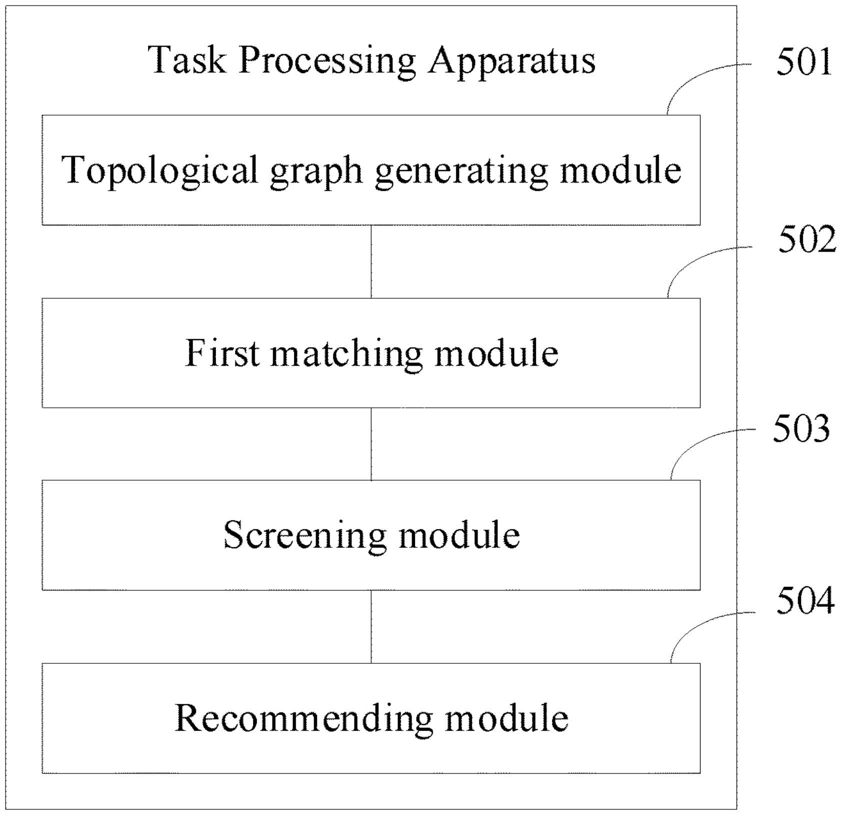
FIG. 5 is a diagram of a task processing apparatus provided by an embodiment of the present disclosure.

As shown in FIG. 5, the task processing apparatus provided by the embodiment of the present disclosure includes:

- a topological graph generating module 501, configured to receive a remote shuffling service request of a target task, and generate a topological graph of the target task according to execution flow information of the target task in response to a remote system service request of the target task, where the topological graph includes a plurality of target nodes, and each target node corresponds to at least one subtask of the target task;
- a first matching module 502, configured to match information of the target node with information of at least one historical node to obtain a first matching result, where the historical node is a node of a topological graph corresponding to a historical task, and the first matching result includes at least one target historical task, that matches the target task, in one or more historical tasks;
- a sifting module 503, configured to sift the target historical task based on a preset attribute condition; and
- a recommending module 504, configured to determine, based on a sifting result, execution parameter recommendation information for the target task as a processing result of the remote shuffling service request.

The task processing apparatus can be applied to a big data computing engine that calculates a target task, and the big data computing engine is used to perform remote shuffling service processing for the received target task. Modules of the task processing apparatus used to perform remote shuffling service processing for the target task are shown in FIG. 5.

In an embodiment of the present disclosure, the first matching module includes:

- a first historical task unit, configured to match first information of the target node with first information of the at least one historical node to obtain a first historical task, where a structure similarity between a topological graph of the first historical task and the topological graph of the target task is greater than a first threshold;
- a second historical task unit, configured to match second information of the target node with second information of a historical node of the first historical task to obtain a second historical task, where a similarity between operator information of the second historical task and operator information of the target node is greater than a second threshold; and
- a second historical task processing unit, configured to obtain the first matching result according to the second historical task.

In an embodiment of the present disclosure, the first information of the target node is obtained based on an identification number of the target node, the second information of the target node is obtained based on the identification number of the target node, and the identification number of the target node is obtained by hash calculation according to a depth of the target node and an identification number of a parent node of the target node.

In an embodiment of the present disclosure, the target node includes a root node and a target descendant node of a target root node, the first information of the at least one historical node includes an identification number of the at least one historical node, and the first historical task unit is further configured to:

- match an identification number of the target root node, as first information of the target root node, with an identification number of a root node in the at least one historical node to obtain a third historical task in the one or more historical tasks, where the identification number of the target root node is calculated based on an identification number of the target descendant node; and
- match the identification number of the target descendant node, as first information of the target descendant node, with identification numbers of descendant nodes in historical nodes of the third historical task, where the identification number of the target descendant node is obtained based on an identification number of a child node of the target descendant node.

In an embodiment of the present disclosure, the second information of the target node includes operator name information and operator parameter information, and the second historical task unit is further configured to:

- match operator name information of the target node with operator name information of the historical node of the first historical task to obtain a fourth historical task, where operator type information of the target node is calculated according to a code of the target node, and an operator name and an input table name included in a subtask corresponding to the target node; and
- match operator parameter information of the target node with operator parameter information of the fourth historical task, where the operator parameter information of the target node is calculated according to the code of the target node, the operator name included in the subtask corresponding to the target node, the input table name included in the subtask corresponding to the target node, and partitions and operator parameters included in the subtask corresponding to the target node.

In an embodiment of the present disclosure, the sifting module includes:

a time sifting unit, configured to, based on the preset attribute condition, sift one or more target historical tasks, where a time difference between task execution time and current time is less than a preset time threshold, as the sifting result.

In an embodiment of the present disclosure, the recommending module includes:

a reference unit, configured to set the execution parameter recommendation information of the target task with reference to an execution parameter of a target historical task corresponding to the sifting result.

In an embodiment of the present disclosure, the reference unit is further configured to:

read group counter information of the target historical task, and if it is determined based on the group counter information that there is a memory overflow situation in the target historical task: based on a partition setting corresponding to the execution parameter of the target historical task, increase the partition setting according to a set step size, and determine the execution parameter recommendation information according to the partition setting after being increased; and read executor resource idle information of the target historical task, and if it is determined based on the executor resource idle information that a read amount of a shuffling operation of a single task is less than a set threshold: based on the partition setting corresponding to the execution parameter of the target historical task, reduce the partition setting according to the set step size, and determine the execution parameter recommendation information according to the partition setting after being reduced.

Figure 6:
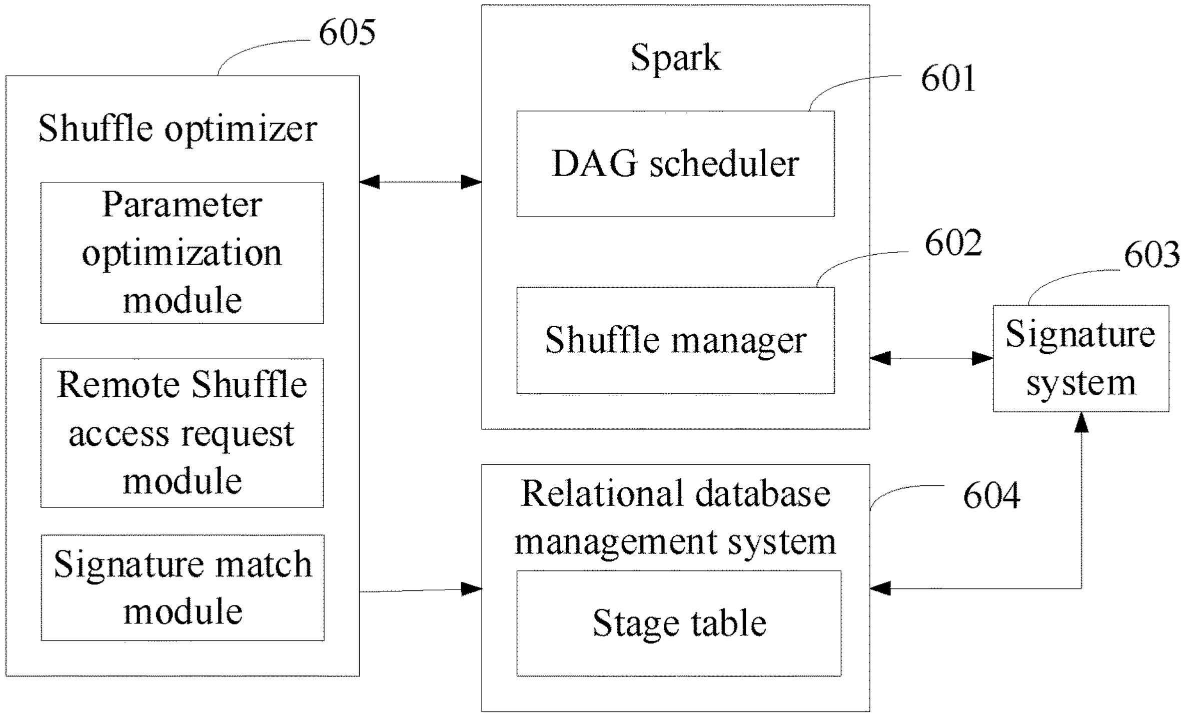
FIG. 6 is a diagram of an overall structure of a task processing apparatus provided by some embodiments of the present disclosure.

FIG. 6 shows an overall structure of a task processing apparatus provided by an embodiment of the present disclosure. The embodiment shown in FIG. 6 takes Spark as an example to process a plurality of tasks. The task processing apparatus includes a DAG scheduler 601, a shuffle manager 602, a signature system 603, a relational database management system (MySQL) 604 and a shuffle optimizer (ShuffleOpt) 605. The DAG scheduler 601 and the shuffle manager 602 are provided by the big data platform Spark. The ShuffleOpt 605 further includes a parameter optimization module (ConfigOpt), a Remote Shuffle access request module (RemoteCoordinator), and a signature match module. The DAG scheduler controls an execution plan of a task, and the shuffle manager controls a shuffle plan of the stage, and is used to submit the stage, configure it to the big data platform, and submit stage matching information to the MySQL 604. Before and after the execution of the Job, the execution plan DAG of the Job is transmitted to the signature system 603, and the signature system calculates four codes (namely, jobTopologySignature, stageTopologySignature, stagePlanSignature and stageExecSignature in the previous embodiment) and stores them in an external database. When the Job is submitted, the external database can be accessed to acquire the historical stage information. The MySQL 604 stores a stage table of tasks.

ShuffleOpt in FIG. 6 is a shuffle optimizer, which includes three modules: a code matching module (SignagureMatch), a Remote Shuffle access request module and a parameter optimization module (ConfigOpt). When the Job is submitted, the signature system is accessed first, which calculates the four codes of DAG, and a best match is obtained from the database by the SignatureMatch. According to a matching result, the historical information and resource usage of the shuffle are obtained, and then the RemoteCoordinator requests access to Remote Shuffle. Remote Shuffle scales elastically according to the required amount of resources, or rejects tasks that may impact cluster stability. Finally, the ConfigOpt sets a reasonable number of partitions and cache size according to the size of the shuffle. In addition, the skewness of the stage is saved in the stage table. If the partition function of the task has not changed, the same partition is likely to be skewed. Remote Shuffle can be informed to reserve a plurality of slots for the skewed partition to speed up the writing of the skewed partition.

The specific embodiment of the above modules can refer to the above methods and drawings, and will not be repeated here. For the convenience of description, the above apparatus is divided into various modules based on functionality for separate description. Of course, the functions of each module can be realized in one or more pieces of software and/or hardware when the present disclosure is implemented.

The apparatus in the above embodiment is used to realize the corresponding method in any of the above embodiments, and has the beneficial effects of the corresponding method embodiment, which will not be repeated here.

Based on the same inventive concept, corresponding to the method in any of the above embodiments, the present disclosure also provides an electronic device, which includes a memory, a processor and a computer program stored in the memory and executable on the processor, and the processor, when executing the program, implements the method in any of the above embodiments.

Figure 7:
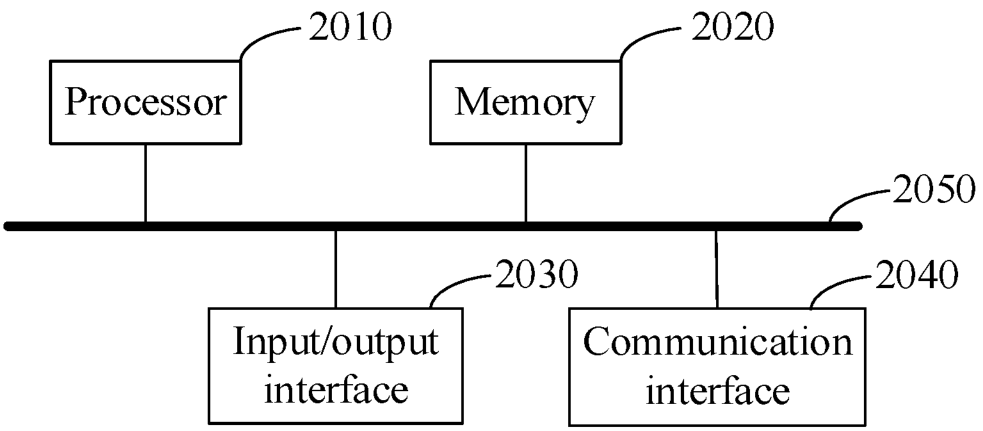
FIG. 7 is a more specific diagram of a hardware structure of an electronic device provided by an embodiment of the present disclosure.

FIG. 7 is a more specific diagram of a hardware structure of an electronic device provided by the embodiment. The device may include a processor 2010, a memory 2020, an input/output interface 2030, a communication interface 2040 and a bus 2050. The processor 2010, the memory 2020, the input/output interface 2030 and the communication interface 2040 are interconnected within the device through the bus 2050 to enable communication between each other.

The processor 2010 can be realized by a general CPU, a microprocessor, an application specific integrated circuit (ASIC), or one or more integrated circuits, etc., for executing related programs to realize the technical solution provided by the embodiment of this specification.

The memory 2020 can be realized by a Read Only Memory (ROM), a Random Access Memory (RAM), a static storage device, a dynamic storage device, etc. The memory 2020 can store an operating system and other application programs. When the technical scheme provided by the embodiment of this specification is realized by software or firmware, relevant program codes are saved in the memory 2020 and invoked and executed by the processor 2010.

The input/output interface 2030 is used to connect input/output modules to realize information input and output. The input/output modules can be configured as components in the device (not shown in the figure) or can be externally connected to the device to provide corresponding functions. The input device can include a keyboard, a mouse, a touch screen, a microphone, various sensors, etc., and the output device can include a display, a speaker, a vibrator, an indicator light, etc.

The communication interface 2040 is used to connect a communication module (not shown in the figure) to realize communication between this device and other devices. The communication module can achieve communication by wired means (such as USB, and network cable) or wireless means (such as mobile network, WIFI, and Bluetooth).

The bus 2050 includes a path for information transfer between various components of the device, such as the processor 2010, the memory 2020, the input/output interface 2030 and the communication interface 2040.

It should be noted that although according to the illustration, the above device only includes the processor 2010, the memory 2020, the input/output interface 2030, the communication interface 2040 and the bus 2050, in the specific embodiment process, the device may also include other components necessary for normal operation. In addition, it can be understood by those skilled in the art that the above-mentioned device may also include only the components necessary to realize the embodiments of this specification, but not all the components shown in the figure.

The electronic device in the above embodiment is used to realize the corresponding method in any of the above embodiments, and has the beneficial effects of the corresponding method embodiment, which will not be repeated here.

Based on the same inventive concept, corresponding to the method in any of the above embodiments, the present disclosure also provides a non-transitory computer-readable storage medium that stores computer instructions for causing a computer to implement the method in any of the above embodiments.

The computer-readable medium, including permanent and non-permanent, removable and non-removable medium, can store information by any method or technology. Information may be a computer-readable instruction, a data structure, a module of programs or other data. Examples of storage medium for the computer include, but are not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a CD-ROM, a digital versatile disc (DVD) or other optical storage, a magnetic cassette, a magnetic tape and a magnetic disk storage or other magnetic storage devices or any other non-transmission media which can be used to store information that can be accessed by the computing device.

The computer instructions stored in the storage medium in the above embodiment are used to make the computer implement the task processing method as described in any of the above embodiments, generating the beneficial effects of the corresponding method embodiment, which will not be repeated here.

It should be understood by those of ordinary skill in the art that the discussion of any of the above embodiments is only exemplary, and it is not intended to imply that the scope of the present disclosure (including the claims) is limited to these examples; under the idea of the present disclosure, the technical features in the above embodiments or other embodiments can also be combined, the steps can be realized in any order, and there are many other variations in different aspects of the embodiments of the present disclosure as described above, which are not provided for the sake of brevity.

In addition, in order to simplify the explanation and discussion, and not to obscure the embodiments of the present disclosure, well-known power/ground connections with integrated circuit (IC) chips and other components may or may not be shown in the provided drawings. In addition, the apparatus may be shown in block diagram form in order to avoid making the embodiments of the present disclosure difficult to understand, and this also considers the fact that details about the embodiment of the apparatus are highly dependent on the platform where the embodiments of the present disclosure will be implemented (i.e., these details should be completely within the understanding range of those skilled in the art). In the case where specific details (e.g., circuits) are set forth to describe exemplary embodiments of the present disclosure, it is obvious to those skilled in the art that the embodiments of the present disclosure can be practiced without these specific details or with changes in these specific details. Therefore, these descriptions should be regarded as illustrative rather than restrictive.

Although the present disclosure has been described in connection with specific embodiments thereof, many alternatives, modifications and variations of these embodiments will be obvious to those skilled in the art from the foregoing description. For example, other memory architectures (e.g., dynamic RAM (DRAM)) may use the discussed embodiments.

The embodiments of the present disclosure are intended to cover all such alternatives, modifications and variations that fall within the broad scope of the append claims. Therefore, any omission, modification, equivalent substitution, improvement, etc. made within the spirit and principles of the embodiments of the present disclosure should be included in the protection scope of the present disclosure.

What is claimed is:

1. A task processing method, comprising:

receiving a remote shuffling service request of a target task, and generating a topological graph of the target task according to execution flow information of the target task in response to a remote system service request of the target task, wherein the topological graph comprises a plurality of target nodes, and each target node corresponds to at least one subtask of the target task;

matching information of the target node with information of at least one historical node to obtain a first matching result, wherein the historical node is a node of a topological graph corresponding to a historical task, and the first matching result comprises at least one target historical task, that matches the target task, in one or more historical tasks;

sifting the target historical task based on a preset attribute condition; and determining, based on a sifting result, execution parameter recommendation information for the target task as a processing result of the remote shuffling service request.

2. The method according to claim 1, wherein matching the information of the target node with the information of the at least one historical node to obtain the first matching result comprises:

matching first information of the target node with first information of the at least one historical node to obtain a first historical task, wherein a structure similarity between a topological graph of the first historical task and the topological graph of the target task is greater than a first threshold;

matching second information of the target node with second information of a historical node of the first historical task to obtain a second historical task, wherein a similarity between operator information of the second historical task and operator information of the target node is greater than a second threshold; and obtaining the first matching result according to the second historical task.

3. The method according to claim 2, wherein the first information of the target node is obtained based on an identification number of the target node, the second information of the target node is obtained based on the identification number of the target node, and the identification number of the target node is obtained by hash calculation according to a depth of the target node and an identification number of a parent node of the target node.

4. The method according to claim 3, wherein the target node comprises a root node and a target descendant node of a target root node, the first information of the at least one historical node comprises an identification number of the at least one historical node, and matching the first information of the target node with the first information of the at least one historical node comprises:

matching an identification number of the target root node, as first information of the target root node, with an identification number of a root node in the at least one historical node to obtain a third historical task in the one or more historical tasks, wherein the identification number of the target root node is calculated based on an identification number of the target descendant node; and matching the identification number of the target descendant node, as first information of the target descendant node, with identification numbers of descendant nodes in historical nodes of the third historical task, wherein the identification number of the target descendant node is obtained based on an identification number of a child node of the target descendant node.

5. The method according to claim 3, wherein the second information of the target node comprises operator name information and operator parameter information, and matching the second information of the target node with the second information of the historical node of the first historical task comprises:

matching operator name information of the target node with operator name information of the historical node of the first historical task to obtain a fourth historical task, wherein operator type information of the target node is calculated according to a code of the target node, and an operator name and an input table name comprised in a subtask corresponding to the target node; and matching operator parameter information of the target node with operator parameter information of the fourth historical task, wherein the operator parameter information of the target node is calculated according to the code of the target node, the operator name comprised in the subtask corresponding to the target node, the input table name comprised in the subtask corresponding to the target node, and partitions and operator parameters comprised in the subtask corresponding to the target node.

6. The method according to claim 1, wherein sifting the target historical task based on the preset attribute condition comprises:

based on the preset attribute condition, sifting one or more target historical tasks, where a time difference between task execution time and current time is less than a preset time threshold, as the sifting result.

7. The method according to claim 6, wherein determining, based on the sifting result, the execution parameter recommendation information for the target task, comprises:

setting the execution parameter recommendation information of the target task with reference to an execution parameter of a target historical task corresponding to the sifting result.

8. The method according to claim 7, wherein setting the execution parameter recommendation information of the target task with reference to the execution parameter of the target historical task corresponding to the sifting result comprises:

reading group counter information of the target historical task, and if it is determined based on the group counter information that there is a memory overflow situation in the target historical task:

based on a partition setting corresponding to the execution parameter of the target historical task, increasing the partition setting according to a set step size, and determining the execution parameter recommendation information according to the partition setting after being increased; and reading executor resource idle information of the target historical task, and if it is determined based on the executor resource idle information that a read amount of a shuffling operation of a single task is less than a set threshold:

based on the partition setting corresponding to the execution parameter of the target historical task, reducing the partition setting according to the set step size, and determining the execution parameter recommendation information according to the partition setting after being reduced.

9. An electronic device, comprising a memory, a processor and a computer program that is stored in the memory and executable on the processor, wherein the processor, upon execution of the computer program, implements operations, the operations comprise:

receiving a remote shuffling service request of a target task, and generating a topological graph of the target task according to execution flow information of the target task in response to a remote system service request of the target task, wherein the topological graph comprises a plurality of target nodes, and each target node corresponds to at least one subtask of the target task;

matching information of the target node with information of at least one historical node to obtain a first matching result, wherein the historical node is a node of a topological graph corresponding to a historical task, and the first matching result comprises at least one target historical task, that matches the target task, in one or more historical tasks;

sifting the target historical task based on a preset attribute condition; and determining, based on a sifting result, execution parameter recommendation information for the target task as a processing result of the remote shuffling service request.

10. A non-transitory computer-readable storage medium storing computer instructions, wherein the computer instructions upon execution by a computer cause the computer to implement operations comprising:

receiving a remote shuffling service request of a target task, and generating a topological graph of the target task according to execution flow information of the target task in response to a remote system service request of the target task, wherein the topological graph comprises a plurality of target nodes, and each target node corresponds to at least one subtask of the target task;

matching information of the target node with information of at least one historical node to obtain a first matching result, wherein the historical node is a node of a topological graph corresponding to a historical task, and the first matching result comprises at least one target historical task, that matches the target task, in one or more historical tasks;

sifting the at least one target historical task based on a preset attribute condition; and determining, based on a sifting result, execution parameter recommendation information for the target task as a processing result of the remote shuffling service request.

11. The electronic device according to claim 9, wherein matching the information of the target node with the information of the at least one historical node to obtain the first matching result comprises:

matching first information of the target node with first information of the at least one historical node to obtain a first historical task, wherein a structure similarity between a topological graph of the first historical task and the topological graph of the target task is greater than a first threshold;

matching second information of the target node with second information of a historical node of the first historical task to obtain a second historical task, wherein a similarity between operator information of the second historical task and operator information of the target node is greater than a second threshold; and obtaining the first matching result according to the second historical task.

12. The electronic device according to claim 11, wherein the first information of the target node is obtained based on an identification number of the target node, the second information of the target node is obtained based on the identification number of the target node, and the identification number of the target node is obtained by hash calculation according to a depth of the target node and an identification number of a parent node of the target node.

13. The electronic device according to claim 12, wherein the target node comprises a root node and a target descendant node of a target root node, the first information of the at least one historical node comprises an identification number of the at least one historical node, and matching the first information of the target node with the first information of the at least one historical node comprises:

matching an identification number of the target root node, as first information of the target root node, with an identification number of a root node in the at least one historical node to obtain a third historical task in the one or more historical tasks, wherein the identification number of the target root node is calculated based on an identification number of the target descendant node; and matching the identification number of the target descendant node, as first information of the target descendant node, with identification numbers of descendant nodes in historical nodes of the third historical task, wherein the identification number of the target descendant node is obtained based on an identification number of a child node of the target descendant node.

14. The electronic device according to claim 12, wherein the second information of the target node comprises operator name information and operator parameter information, and matching the second information of the target node with the second information of the historical node of the first historical task comprises:

matching operator name information of the target node with operator name information of the historical node of the first historical task to obtain a fourth historical task, wherein operator type information of the target node is calculated according to a code of the target node, and an operator name and an input table name comprised in a subtask corresponding to the target node; and matching operator parameter information of the target node with operator parameter information of the fourth historical task, wherein the operator parameter information of the target node is calculated according to the code of the target node, the operator name comprised in the subtask corresponding to the target node, the input table name comprised in the subtask corresponding to the target node, and partitions and operator parameters comprised in the subtask corresponding to the target node.

15. The electronic device according to claim 9, wherein sifting the target historical task based on the preset attribute condition comprises:

based on the preset attribute condition, sifting one or more target historical tasks, where a time difference between task execution time and current time is less than a preset time threshold, as the sifting result.

16. The electronic device according to claim 9, wherein determining, based on the sifting result, the execution parameter recommendation information for the target task, comprises:

setting the execution parameter recommendation information of the target task with reference to an execution parameter of a target historical task corresponding to the sifting result.

17. The electronic device according to claim 16, wherein setting the execution parameter recommendation information of the target task with reference to the execution parameter of the target historical task corresponding to the sifting result comprises:

reading group counter information of the target historical task, and if it is determined based on the group counter information that there is a memory overflow situation in the target historical task:

based on a partition setting corresponding to the execution parameter of the target historical task, increasing the partition setting according to a set step size, and determining the execution parameter recommendation information according to the partition setting after being increased; and reading executor resource idle information of the target historical task, and if it is determined based on the executor resource idle information that a read amount of a shuffling operation of a single task is less than a set threshold:

based on the partition setting corresponding to the execution parameter of the target historical task, reducing the partition setting according to the set step size, and determining the execution parameter recommendation information according to the partition setting after being reduced.

18. The non-transitory computer-readable storage medium according to claim 10, wherein matching the information of the target node with the information of the at least one historical node to obtain the first matching result comprises:

matching first information of the target node with first information of the at least one historical node to obtain a first historical task, wherein a structure similarity between a topological graph of the first historical task and the topological graph of the target task is greater than a first threshold;

matching second information of the target node with second information of a historical node of the first historical task to obtain a second historical task, wherein a similarity between operator information of the second historical task and operator information of the target node is greater than a second threshold; and obtaining the first matching result according to the second historical task.

19. The non-transitory computer-readable storage medium according to claim 10, wherein sifting the at least one target historical task based on the preset attribute condition comprises:

based on the preset attribute condition, sifting one or more target historical tasks, where a time difference between task execution time and current time is less than a preset time threshold, as the sifting result.

20. The non-transitory computer-readable storage medium according to claim 10, wherein determining, based on the sifting result, the execution parameter recommendation information for the target task, comprises:

setting the execution parameter recommendation information of the target task with reference to an execution parameter of a target historical task corresponding to the sifting result.

* * * * *